(12) United States Patent
Wouters (10) Patent No.: US 7,575,379 B2
(45) Date of Patent: Aug. 18, 2009

(54) BODY HAVING STAKING PIN AND METHOD OF MAKING

(75) Inventor: Vincent A. Wouters, McKinney, TX (US)

(73) Assignee: Applied Optical Systems, Inc., Plano, TX (US)

( * ) Notice: Subject to any disclaimer, the term of this patent is extended or adjusted under 35 U.S.C. 154(b) by 0 days.

(21) Appl. No.: 11/473,373

(22) Filed: Jun. 22, 2006

(65) Prior Publication Data

US 2007/0297725 A1    Dec. 27, 2007

(51) Int. Cl.
    *G02B 6/36* (2006.01)
(52) U.S. Cl. .......................................... 385/78; 385/76
(58) Field of Classification Search .................. None
    See application file for complete search history.

(56) References Cited

U.S. PATENT DOCUMENTS

| | | | |
|---|---|---|---|
| 3,219,961 A | | 11/1965 | Bailey et al. |
| 3,613,497 A | | 10/1971 | Heldermann |
| 4,807,958 A | * | 2/1989 | Gunner et al. ................. 385/74 |
| 4,824,202 A | | 4/1989 | Auras |
| 5,017,067 A | * | 5/1991 | Ohlin .......................... 411/45 |
| 5,160,226 A | * | 11/1992 | Lee, II ......................... 411/72 |
| 5,187,626 A | * | 2/1993 | Hopkins et al. .......... 360/265.9 |
| 7,044,566 B1 | * | 5/2006 | Penninger et al. ........ 303/114.1 |
| 7,063,104 B2 | * | 6/2006 | McIntyre et al. ........ 137/315.05 |
| 2004/0018042 A1 | | 1/2004 | Smith |

FOREIGN PATENT DOCUMENTS

JP          60078165 A    *    5/1985

OTHER PUBLICATIONS

International Search Report issued on Mar. 12, 2008 in PCT Patent Application No. PCT/US07/14600.
Written Opinion issued on Mar. 12, 2008 in PCT Patent Application No. PCT/US07/14600.

* cited by examiner

*Primary Examiner*—Omar Rojas
(74) *Attorney, Agent, or Firm*—Robert D. McCutcheon (57) ABSTRACT

A body, such as a connector for use in cable assemblies, includes a staking pin or retaining body inserted and secured within an aperture extending from a first surface to a second surface of the body. A portion of the pin extends through the aperture and beyond one of the surfaces (which provides a pin function for a desire application). A plurality of projections or grooves positioned along the external surface of the staking pin are substantially flush with a surface of the aperture to retain its position in the body. The staking pin includes a cavity, a portion of which preferably has a chamfered surface to aid in disposing an object, such as a staking pin ball, within the cavity. The cavity is capable of radially expanding when the staking pin ball, having an outer dimension greater than an inner dimension the cavity, is inserted within the cavity of the pin.

24 Claims, 7 Drawing Sheets

FIGURE 7

BODY HAVING STAKING PIN AND METHOD OF MAKING

TECHNICAL FIELD

The present invention relates generally to body and pin connections/couplings, and more particularly to a connector having a body with a pin secured to the body.

BACKGROUND

Fiber-optic connectors are typically intended for use with low loss optical fiber cables in military, ground-based, and fiber-optic data transmission systems. Most applications require environmental resistant as well as fiber-optic connectors, such as MIL-PRF-83526C connectors, to have a consistent and predictable optical performance.

Fiber-optic connectors often include a connector body retaining fixture or pin. These fixtures are often placed to extend internally within the connector body. Thus, it is difficult for manufacturers to install these retaining fixtures with precision. Retaining fixtures are currently either integrally formed or inserted manually into and secured within an aperture in the body of the connector body. Often times, poor installation of such fixtures compromises the integrity of connectors and consequently the entire fiber optic system.

Accordingly, there exists a need for an improved fiber optic connector having easily manufacturable retaining fixture, such as a pin, and specifically a method of securing a pin within a body for one or more applications. In particular, there is a need for holding and retaining fixtures for use in connectors that are easy to install and environmentally resistant.

SUMMARY

In accordance with one embodiment of the present invention, there is a connector body operable for use in a fiber optic connector disclosed. The connector body includes a housing having a body, an inner surface, an outer surface and an aperture through the body from the outer surface to the inner surface. The connector body also includes a retaining body having a cavity, an external surface and a projection along the external surface. The projection is disposed substantially flush with a surface of the aperture. The connector further includes an object having an outer dimension greater than an inner dimension the cavity. The object is rigidly disposed within the cavity.

In another embodiment, there is provided a method of attaching a pin to a body of a connector housing. The method providing a connector housing having a body including a first surface, a second surface and an aperture extending through the body from the first surface to the second surface; disposing the pin in the aperture, the pin having a cavity, an external surface and a projection along the external surface; positioning a first end of the pin through the aperture and beyond the first surface of the body; and inserting an object within the cavity, the object having an outer dimension greater than an inner dimension the cavity, thereby expanding the external surface of the pin and securing the pin to the body.

In yet another embodiment, there is provided a connector body for use in a fiber optic connector. The connector includes a housing having a body, an inner surface, an outer surface and an aperture through the body from the outer surface to the inner surface. The connector also includes a retaining body having a cavity and an external surface. A portion of the retaining body extends through the aperture and beyond the inner surface of the housing body. A portion of the cavity includes a chamfered surface and is capable of radially expanding. The connector further includes a projection along the external surface. The projection is disposed substantially flush with a surface of the aperture. The connector also includes an object having an outer dimension greater than an inner dimension the cavity. The object is rigidly disposed within the cavity.

In still another embodiment, there is provided an apparatus having a first body and a pin body. The first body includes a first surface, a second surface and an aperture extending through the body from the first surface to the second surface. The pin body includes a cavity and is disposed within the aperture and extends a predetermined distance from one of the surfaces. A second body is disposed in the cavity of the pin body and exerts a force within the cavity of the pin body radially outward to cause the pin body to contact and become secured to the first body.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
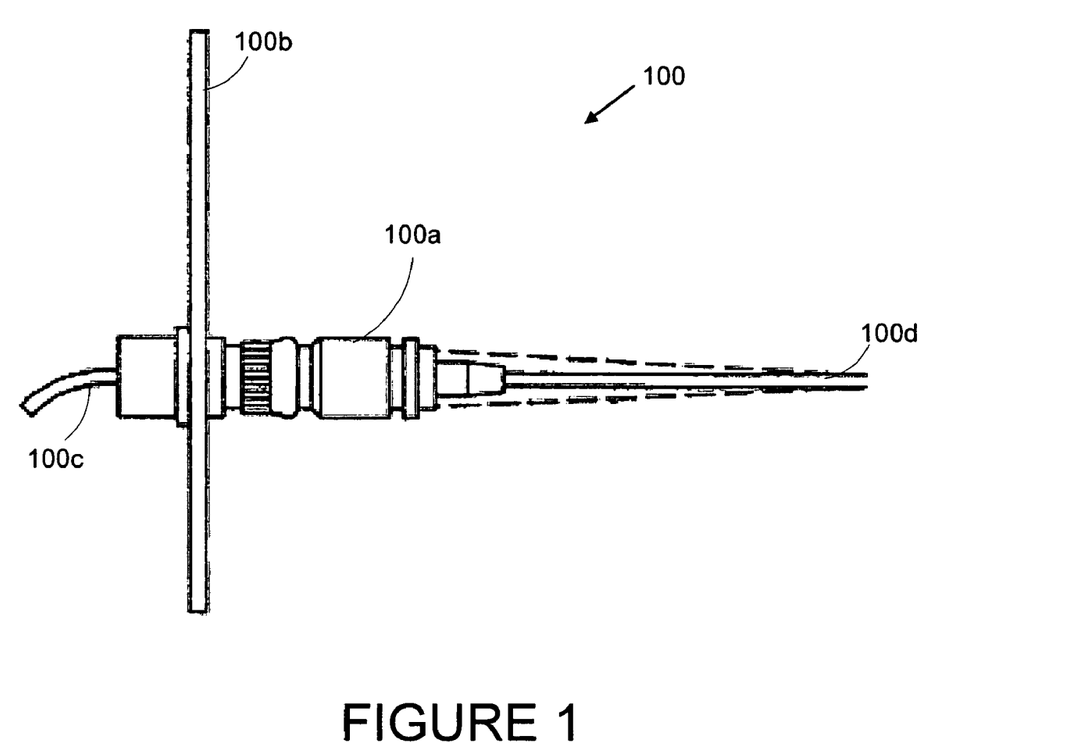
FIG. 1 depicts a typical application for a fiber optic connector.

FIG. 1 generally illustrates a typical application for a fiber optic connector assembly 100. Connector assembly 100 is mounted on a rigid panel 100b and connects one end 100c of a fiber optic cable to an end 100d of another fiber optic cable.

It should be understood that connectors similar to connector 100 are typically used in a number of different applications, such as electrical cables or other cable assemblies. The concepts, teachings and embodiments of the present invention are not necessarily limited to connectors in general, but may be used in other types of applications such as those that may utilize any body with a pin configuration. The following description, however, will describe one application of the present invention in connection with a connector assembly 100. In one embodiment, the connector assembly in a fiber optic connector for use in fiber optic applications.

Figure 2A:
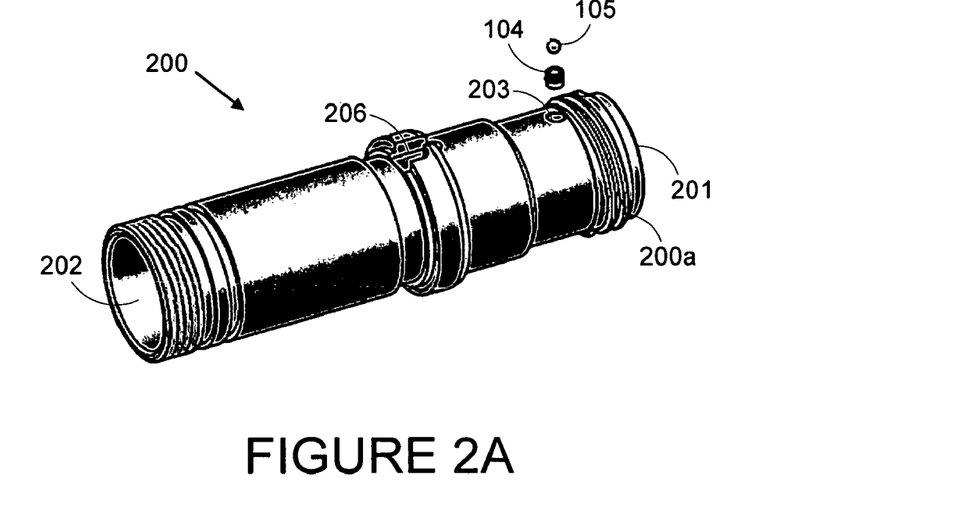
FIG. 2A depicts plug body receptacle for fiber optic connector in accordance with one embodiment of the present invention.

Connector assembly 100 generally includes a plug body coupling 100a and a plug body receptacle 200 (later described in conjunction with FIG. 2). In accordance with one embodiment of the present invention, plug body coupling 100a and plug body receptacle 200 are preferably threadably attached and in an interlocked position to form connector assembly 100 as later described in detail herein.

Figures 1A, 1B:
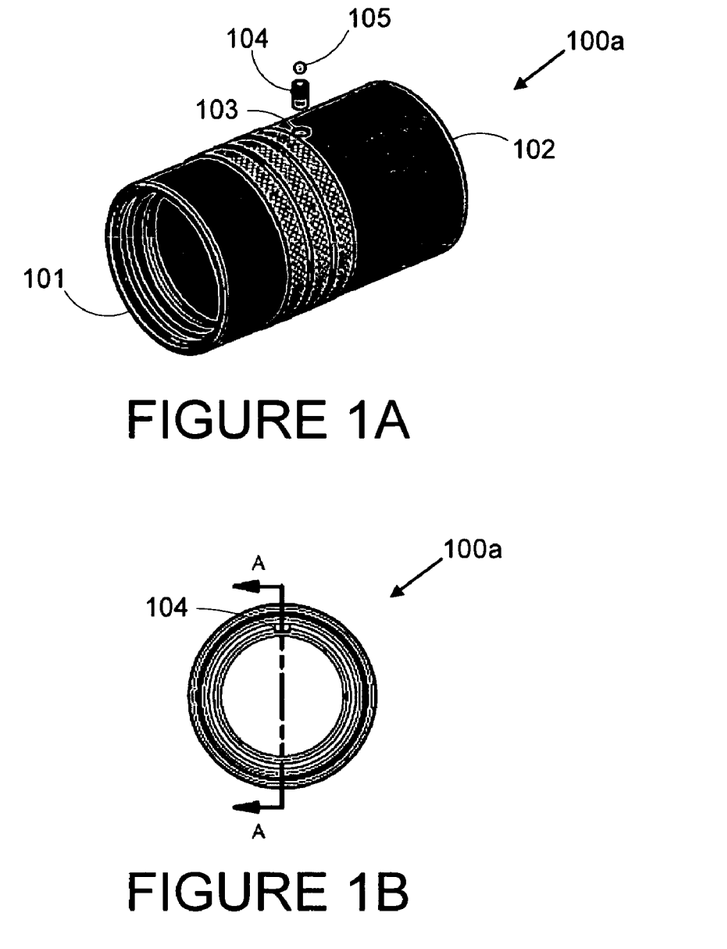
FIG. 1A depicts a plug body coupling for a fiber optic connector in accordance with one embodiment of the present invention.
FIG. 1B is a cross-sectional view of the plug body coupling of FIG. 1A.
Figure 1C:
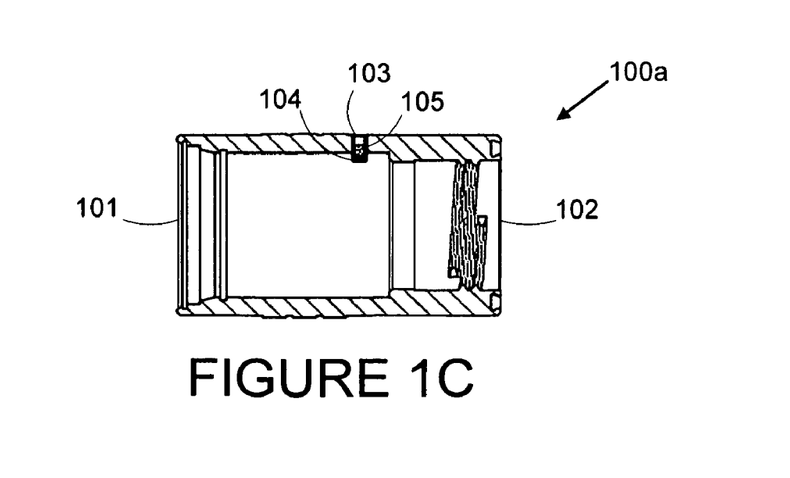
FIG. 1C is a longitudinal section view taken along section line A-A of FIG. 1B.

FIGS. 1A-1C illustrate an plug body coupling 100a for a connector assembly 100 in accordance with one embodiment of the present invention. Plug body coupling 100a includes an elongated, cylinder-like body having an unthreaded first or proximate end 101 and internally threaded second or distal end 102. It will be understood that plug body coupling 100a illustrated in FIG. 1 may include fewer, more or different components as specifically shown, without departing from the spirit and scope of the present invention.

Proximate end 101 is unthreaded but preferably includes recessed and staggered indentations along the internal surface of plug body coupling 100a. Plug body coupling 100a includes an aperture or pin opening 103. Aperture 103 is configured to receive (have disposed therein) a plug body retaining fixture having a first member 104 and a second member 105. The first member 104 is preferably an elongated cylinder-like expansion or staking pin 104 (referred hereinafter as staking pin 104). The second member is preferably a spherical staking pin ball 105 (referred hereinafter as staking pin ball 105).

The housing of plug body coupling 100a, the staking pin 104, and the staking pin ball 105 are preferably made of metal. In order for the plug body holding fixture to maintain structural integrity, however, staking pin ball 105 is made with a hard metal, while the metal used for staking pin 104 is preferably made of a relatively softer metal. Moreover, the metal used for the housing of plug body coupling 100a is relatively softer than the metal used for staking pin 104. The preferred size and structure of staking pin 104 and staking pin ball 105 are described later in detail herein in conjunction with FIGS. 3A, 3B, 4 and 5.

Distal end 102 may be configured to hold an O-ring (not shown) to aid in providing a seal with other connectors and offers added protection from environmental factors.

Referring now to FIG. 1C, a longitudinal section view taken along section line A-A of FIG. 1B is shown. As illustrated, the staking pin 104 and the staking pin ball 105 are shown in the inserted or secured position within the aperture 103.

Figure 2B:
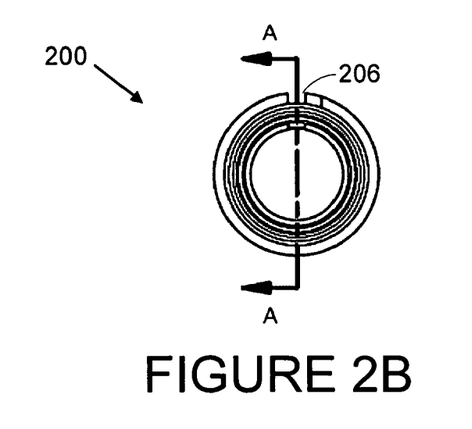
FIG. 2B is a cross-sectional view of the plug body receptacle of FIG. 2A.
Figure 2C:
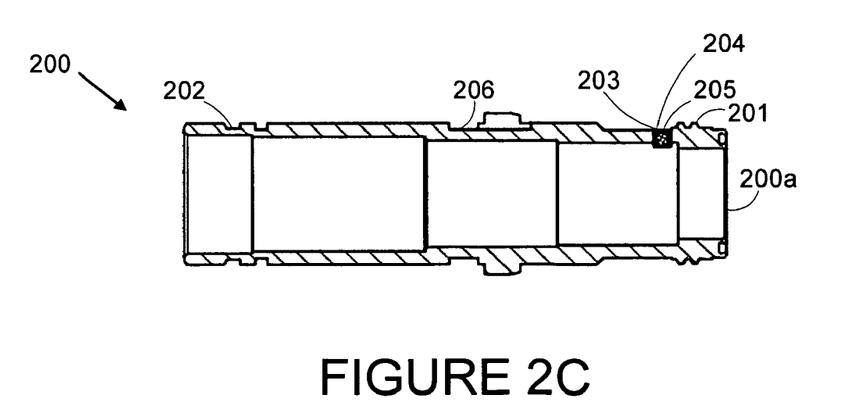
FIG. 2C is a longitudinal section view taken along section line A-A of FIG. 2B.

FIGS. 2A-2C depict plug body receptacle 200 for connector 100 in accordance with one embodiment of the present invention. Plug body receptacle 200 includes a generally elongated, cylinder-like body having an externally threaded first or proximate end 201 and a second or distal end 202. It will be understood that plug body receptacle 200 illustrated in FIG. 2 may include fewer, more or different components as specifically shown, without departing from the spirit and scope of the present invention.

As disclosed earlier, proximate end 201 preferably includes threaded grooves 200a and is configured to threadably attach to the internally threaded distal end 102 of plug body coupling 100a. In other words, plug body receptacle 200 is configured to fit inside plug body coupling 100a so that the respective distal ends 102 and 201 are removable attached by a threaded coupling.

Locking groove 206 of plug body receptacle 200 is preferably configured to removably mate with staking pin 104 of plug body coupling 100a when plug body receptacle 200 is inserted and coupled with plug body coupling 100a. Locking groove 206 preferably includes two adjacent, recessed regions for positioning and locking staking pin 104 into the locking groove 206 in accordance with one embodiment of the present invention. It will be understood that locking groove 206 illustrated in FIG. 2 may include fewer, more or different components as specifically shown, without departing from the spirit and scope of the present invention.

In accordance with one embodiment of the present invention, plug body receptacle 200 also includes an aperture or pin opening 203. Similar to the aperture 103, the aperture 203 is configured to receive (have disposed therein) a second plug body retaining fixture that includes the staking pin 104 and the staking pin ball 105.

Plug body receptacle 200 may also include an O-ring (not shown) at the proximate end 201 and at the distal end 202. The O-ring aids in providing a seal with other connectors and offers added protection from environmental factors.

Referring now to FIG. 2C, a longitudinal section view taken along section line A-A of FIG. 2B is shown. As illustrated, the staking pin 104 and the staking pin ball 105 are shown in the inserted or secured position within the aperture 203. FIG. 2C also illustrates that when staking pin ball 105 is pressed into the body of the staking pin 104, a portion of staking pin 104 projects into the internal body of plug body coupling 200. In accordance with one embodiment of the present invention, the projected portion of staking pin 104 is configured to removably lock into place with a locking groove of another fiber optic connector (not shown).

Figure 3A:
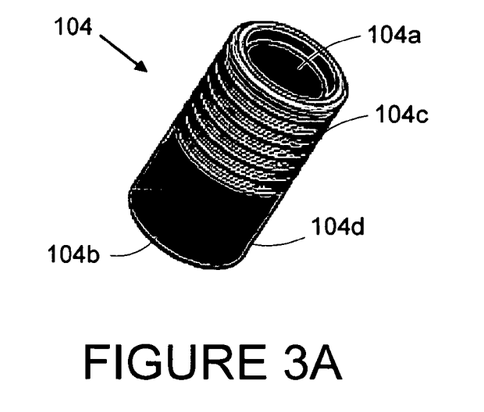
FIG. 3A is a detailed view of the stake pin of the plug body coupling in accordance with one embodiment of the present invention.
Figure 3B:
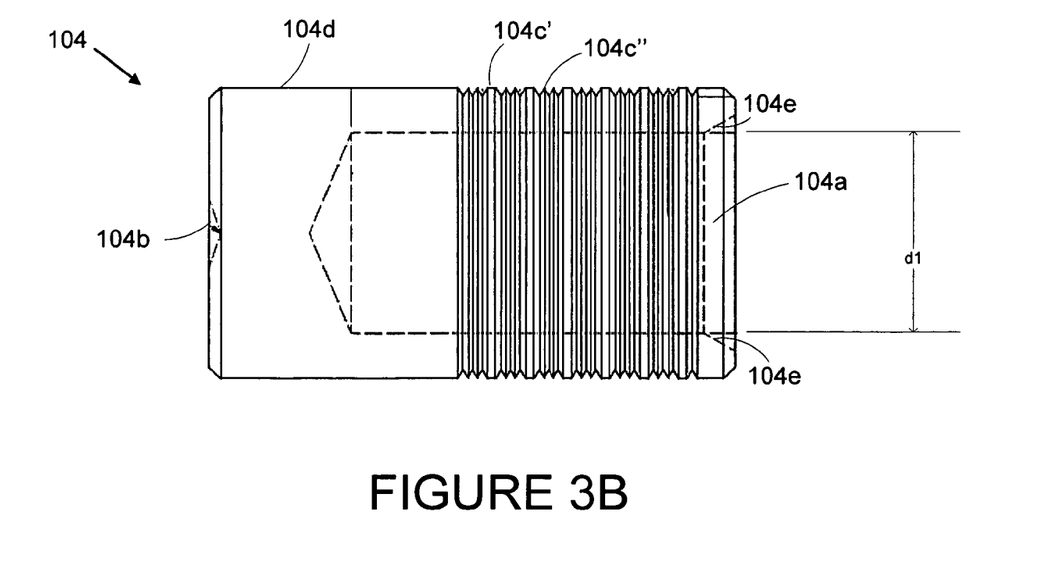
FIG. 3B is a more detailed view of the stake pin of FIG. 3A.

FIGS. 3A and 3B are detailed views of the staking pin 104 in accordance with one embodiment of the present invention. Staking pin 104 includes an elongated cylinder-like body having a first or proximate end 104a and a second or distal end 104b. The proximate end 104a includes a cavity (shown in dotted lines) disposed therein and extending into the body of the staking pin 104. The cavity includes a tapered surface 104e (a chamfered surface) at the cavity entrance. As will be described later, this tapered surface is configured to receive the staking pin ball 105. The cavity is annular, extends a predetermined distance into the pin body, and includes an inner diameter d1.

The outer surface of the proximate end 104a includes a grooved area 104c having ridges or projections which aid in retaining the staking pin 104 within the aperture 103 of the coupling body 100a (or within the aperture 203 of coupling body 200a). The ridges or projections include one or more primary ridges or projections 104c' and one or more secondary ridges or projections 104c". Alternatively, the ridges or projections may be described as threads or grooves. Threads, grooves, ridges or projections 104c' and 104c" are preferably located such that when the staking pin 104 is inserted within the aperture 103, 203 at the desired depth or position, these grooves are adjacent to the exposed sidewalls of the body 100a, 200a (as exposed by the apertures). Although a preferred groove pattern 104c is depicted in FIG. 3B, other groove patterns or configurations may be used in accordance with the present invention.

In one embodiment, the primary projections 104c' are spaced apart approximately 0.16 inches, while the secondary projections 104c" are spaced apart approximately 0.004 inches. The sidewalls or groove between the secondary projections are preferably cut at about a sixty degree angle.

It will be understood that the dimensions and other features of the staking pin 104 will be chosen for the desired application, consistent with the teachings herein. In one specific one embodiment, the body of staking pin 104 has an outer diameter of about 0.12 inches and is about 0.22 inches in length. This length is usually determined by the desired position of the pin 104 with respect to the connector housing 100a, 200a (e.g., how far the pin extends internally into the body of the housing, or how far the pin extends from a surface of a body). The diameter d1 is about 0.86 inches. The diameter of the outermost portion of the tapered surface 104 is about 0.1 inches. The staking pin 104 is constructed or composed of any material, including metal, and in one embodiment is constructed of a material that is harder than the material of the plug body 100a, 200a. In one preferred embodiment, the staking pin 104 is made of 303 stainless steel.

A portion of staking pin 104 projects or extends inward from an inner surface of the plug body coupling 100a (see FIG. 1C). According to one embodiment of the present invention, the projected portion of staking pin 104 is configured to removably lock into place with a locking groove 206 of plug body receptacle 200 as described in conjunction with FIG. 2.

Figure 4:
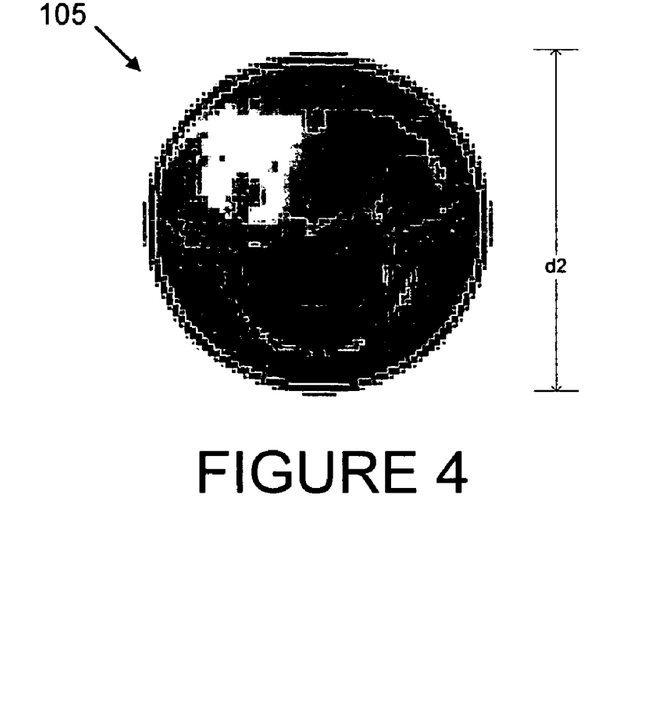
FIG. 4 is a detailed view of staking pin ball in accordance with one embodiment of the present invention.

FIG. 4 illustrates a preferred embodiment of the staking pin ball 105 having a diameter d2. Diameter d2 is slightly larger than diameter d1 of the cavity disposed within the staking pin 104. In one specific embodiment, the staking pin ball 105 is spherically shaped. Although staking pin ball 105 is described and depicted as a spherical shape, staking pin ball 105 may be any shape that, when inserted within the cavity of staking pin 104, is capable of outwardly expanding the body of the staking pin 104, such as in a radial manner. Thus, staking pin ball 105 has a cross-sectional or cross dimension, at some point, is greater than the diameter of the cavity within the staking pin 104.

In one embodiment, the diameter d2 is chosen to expand the outer surface of staking pin 104 (such as substantially radially) a distance sufficient to contact the sidewalls of the apertures 103, 203. In a specific embodiment, diameter d2 is about 0.094 inches, which is about 0.008 inches greater than diameter d1. Staking pin ball 105 may be constructed or comprised of any material, including metal, and in one embodiment is constructed of a material that is harder than the material of the staking pin 104. In one preferred embodiment, staking pin ball 105 is made of 440-C stainless steel.

Figure 5:
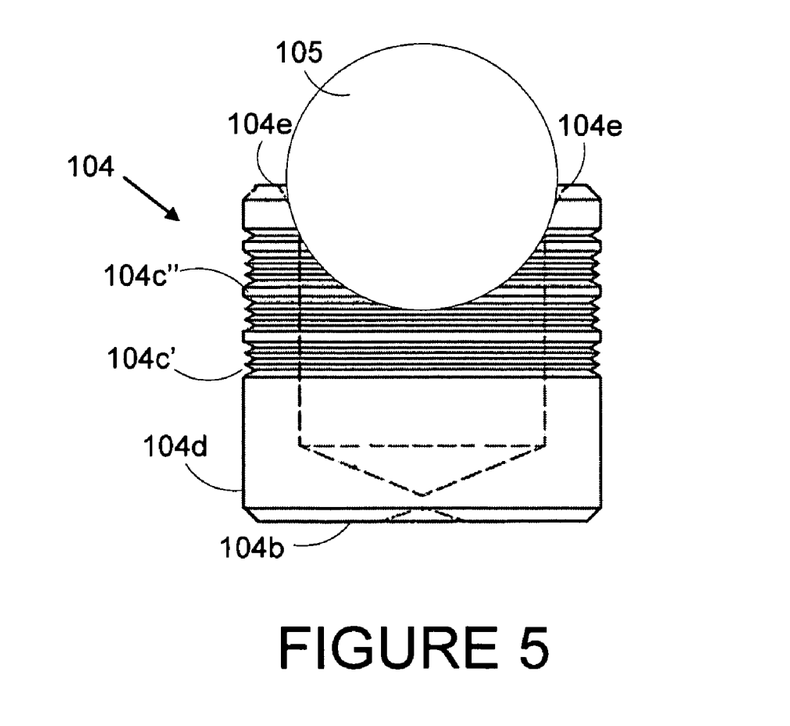
FIG. 5 illustrates the positional relationship between the staking pin and the staking pin ball before pressing the staking pin ball into the staking pin in accordance with one embodiment of the present invention.

Referring now to FIG. 5, the opening or cavity of the staking pin 104 preferably includes the tapered side wall(s) 104e. This configuration operably holds and/or positions the staking pin ball 105 for eventual insertion into the staking pin 105. Insertion is accomplished by applying a force to the staking pin ball 105 and pressing it into the cavity. FIG. 5 illustrates the positional relationship between the staking pin ball 105 and staking pin 104 before staking pin ball 105 is inserted or deposited into the body of staking pin 104. As the staking pin ball 105 is pressed into the cavity, force is generated by the inserted ball and radially (or outwardly) applied to the outer walls of the staking pin 104. The diameter or dimension across the outer walls increases (along the grooved area 104c) and the projections or grooves are forced into or penetrate the sidewall of the aperture 103, 203. This rigidly secures the staking pin 104 to the connector 100a, 200a.

In accordance with one embodiment of the present invention, staking pin ball 105 may be inserted or pressed into the body of the staking pin 104 with the aid of a Schmidt press or similar instrument. Preferably, once the staking pin ball 105 is pressed into place, it is not easily removable.

Figure 6:
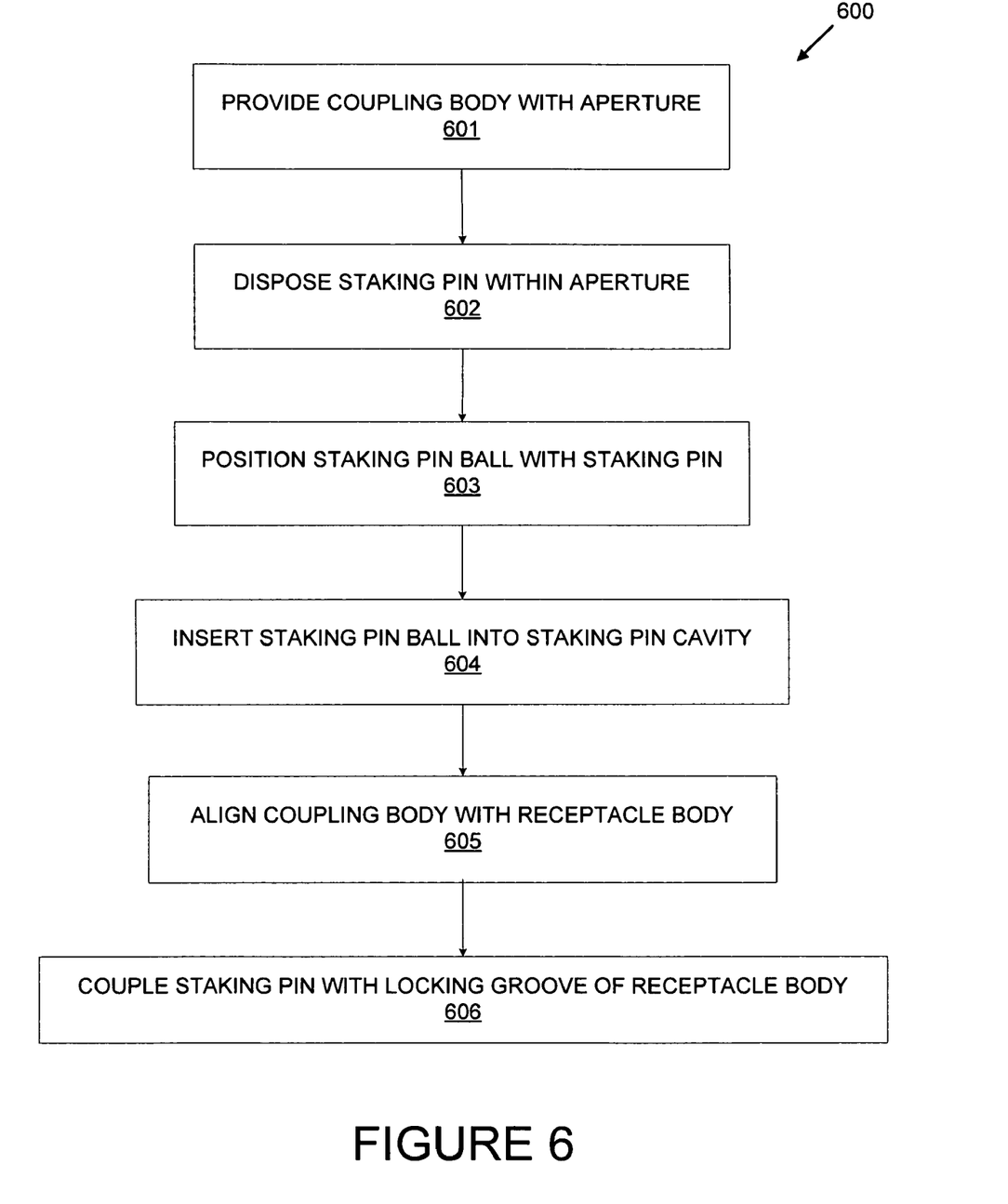
FIG. 6 is simplified flow chart of the method of attaching a coupling body to a receptacle body for a connector in accordance with one embodiment of the present invention.

Referring now to FIG. 6, a somewhat simplified flowchart illustrating a method of securing a pin 104 to a body 100 is disclosed. A body, such as connector body 100a, is provided (step 601). The body 100a is formed to include the aperture 103 configured to receive the staking pin 104. The aperture 103 may be formed using methods commonly known.

A staking pin 104 is disposed in a predetermined position within the aperture 103 (step 602). It will be understood that any known method may be used to position the staking pin 104. In one embodiment, the body is positioned about a mandrel. The mandrel provides dual functions. It is used to set the position or depth of the staking pin 104 within the aperture 103. The staking pin 104 is positioned such that the groove surface area 104c is adjacent to the sidewalls of the aperture 103, and the pin 104 extends inward of the coupling body the desired distance. The mandrel also supports the staking pin 104 during insertion of the staking ball into the pin 104.

A staking pin ball or other object is positioned and placed atop the staking pin 104 (within the "cup" formed by the tapered surface(s) 104e of the staking pin 104) (step 603). The staking pin ball 105 is then inserted and pressed into the cavity of the staking pin 104 to a desired depth (step 604). As the pin ball 105 travels into the cavity of the pin 104, the outer body portion of the pin 104 is forced in a radial direction which increases the outer diameter of the pin 104. This force causes the groove area 104c' to contact the sidewalls of the aperture 103. The grooves or projections of the staking pin 104 dig into and grip the body 100a, thus securing the staking pin 104 in place within the aperture 103.

It will be understood that the diameter of the aperture 103 is correspondingly chosen in conjunction with the dimensions of the staking pin 104 and staking pin ball 105 such that the deformation of the staking pin 104 (radially outward) caused by the insertion of the staking pin ball 105 results in a strong and sealed connection between the body 100a and the staking pin 104.

It will be understood that these steps may be repeated for securing an additional staking pin 104 within aperture 203 of the body 200a, if desired.

As will be appreciated, the steps 601 thru 604 provide a method of securing a pin to a body, as described herein. After the pin 104 is secured, the body may be further processed or used in one or more other applications.

For example, if the body is a connector housing or plug body, the proximate end 101 of coupling body 100a may be then aligned with the receptacle body 200a and coupled thereto, such as by threading engagement (step 605). As the coupling body 100a and the receptacle body 200 are coupled to one another, a locking groove 206 of the receptacle body 200 locks the staking pin 104 attached to the coupling body 100a in position (step 606), thereby completing the assembly of connector 100.

Figure 7:
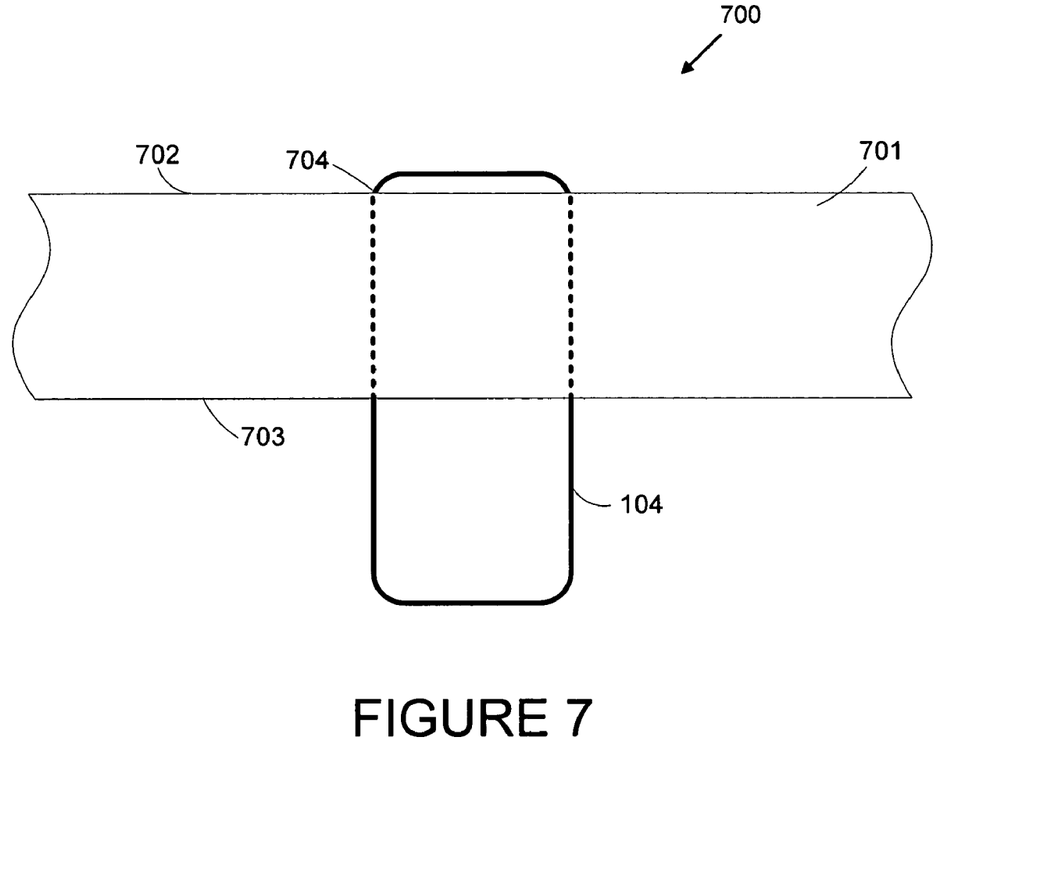
FIG. 7 illustrates an alternative embodiment in accordance with the present invention of an apparatus having a pin secured to a body.

Referring now to FIG. 7, there is shown an alternative embodiment of the present invention, in which an apparatus 700 includes a body or structure 701 having a first surface 702 and a second surface 703. The body 701 includes an opening or aperture 704 (similar to aperture 103, 203) extending from the first surface 702 to the second surface 703 through the body 701.

The pin 104 is disposed in a predetermined position within the aperture 704 such that one end of the pin 104 extends outward from one of the surfaces 702, 703. For example, the pin 104 preferably extends beyond the first surface 703 as depicted in FIG. 7. The pin 104 is positioned such that an external surface of pin 104 is adjacent to the sidewalls of the aperture 704. It will be understood that any known method may be used to position the pin 104. The staking ball or object 105 is inserted into the cavity of the pin 104 to a desired depth, as previously described, thereby securing the pin 104 to the body 701.

Though the embodiments are described herein with respect to a connector, such as a fiber optic connector, and related suitable applications, other embodiments contemplate that the concepts and teachings of the present invention may be utilized for other parts, objects, connectors and housings.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector body operable for use in a fiber optic connector, comprising:
    a housing having a body having an inner surface, an outer surface and an aperture extending through the body from the outer surface to the inner surface;
    a retaining body having a cavity, an external surface and a projection along the external surface, the projection disposed substantially flush with a surface of the aperture, wherein at least a portion of the retaining body extends inward beyond the inner surface of the housing, the retaining body includes a first end and a solid second end, wherein the cavity extends from the first end into the retaining body and the second end extends inward beyond the inner surface of the housing;
    an object having an outer dimension greater than an inner dimension of the cavity, the object rigidly disposed within the cavity, wherein a portion of the object corresponding to the outer dimension is disposed within the cavity; and
    a locking groove on an external surface of a coupling body, the locking groove configured to mate with the portion of the retaining body.

2. The connector body in accordance with claim 1, wherein a portion of the cavity comprises a chamfered surface.

3. The connector body in accordance with claim 1, wherein the cavity is capable of radially expanding to accommodate the object.

4. The connector body in accordance with claim 1, wherein the retaining body comprises a first material and the object comprises a second material, the second material relatively harder than the first material.

5. The connector body in accordance with claim 4, wherein the second material is 440-C stainless steel.

6. The connector body in accordance with claim 4, wherein the housing comprises a third material, the third material relatively softer than the first material.

7. The connector body in accordance with claim 1, wherein the body of the housing is cylinder-like.

8. The connector body in accordance with claim 1, wherein the coupling body comprises a threaded end coupled to a threaded end of the housing body.

9. A method of attaching a pin to a body of a connector housing, the method comprising:
    providing a connector housing having a body including a first surface, a second surface and an aperture extending through the body from the first surface to the second surface;
    disposing the pin in the aperture, the pin having a first end, a second end, a cavity extending within the pin form an opening at the second end, an external surface and a projection along the external surface;
    positioning the first end of the pin through the aperture and beyond the first surface of the body;
    inserting an object within the cavity, the object having an outer dimension greater than an inner dimension of the cavity, thereby expanding the external surface of the pin and securing the pin to the body, and wherein a portion of the object corresponding to the outer dimension is disposed within the cavity; and
    mating the first end of the pin with a locking groove on an external surface of a coupling body, the coupling body comprising a threaded end coupled to a threaded end of the housing body.

10. The method in accordance with claim 9, wherein a portion of the cavity comprises a chamfered surface configured to aid in positioning the object.

11. The method in accordance with claim 9, wherein the pin comprises a first material and the object comprises a second material, the second material harder than the first material.

12. The method in accordance with claim 11, wherein the second material is 440-C stainless steel.

13. The method in accordance with claim 11, wherein the body comprises a third material, the third material softer than the first material.

14. The method in accordance with claim 9 wherein the body of the connector housing is cylinder-like.

15. The method in accordance with claim 9, wherein the coupling body comprises a threaded end coupled to a threaded end of the housing body.

16. A connector body for use in a fiber optic connector, comprising:
    a housing having a body having an inner surface, an outer surface and an aperture extending through the body from the outer surface to the inner surface;
    a retaining body having a first end, a second end, a cavity extending from the first end into the retaining body and an external surface, the second end of the retaining body extending through the aperture and beyond the inner surface of the housing body, and a portion of the cavity having a chamfered surface and is capable of radially expanding;
    a projection along the external surface, the projection disposed substantially flush with a surface of the aperture;
    an object having an outer dimension greater than an inner dimension of the cavity, the object rigidly disposed within the cavity, and wherein a portion of the object corresponding to the outer dimension is disposed within the cavity; and
    a locking groove on an external surface of a coupling body, the locking groove configured to mate with the portion of the retaining body.

17. The connector body in accordance with claim 16, wherein the retaining body comprises a first material and the object comprises a second material, the second material relatively harder than the first material.

18. The connector body in accordance with claim 17 wherein the second material is 440-C stainless steel.

19. The connector body in accordance with claim 17, wherein the housing comprises a third material, the third material relatively softer than the first material.

20. The connector body in accordance with claim 16 wherein the body of the housing is cylinder-like.

21. The connector body in accordance with claim 16, wherein the coupling body comprises a threaded end coupled to a threaded end of the housing body.

22. A connector body operable for use in a fiber optic connector, comprising:
   a housing having a body, an inner surface, an outer surface and an aperture through the body from the outer surface to the inner surface;
   a retaining body having a cavity, an external surface and a projection along the external surface, the projection disposed substantially flush with a surface of the aperture, wherein a portion of the retaining body extends through the aperture and beyond the inner surface of the housing body;
   an object having an outer dimension greater than an inner dimension of the cavity, the object rigidly disposed within the cavity; and
   a locking groove on an external surface of a coupling body, the locking groove configured to mate with the portion of the retaining body, wherein the coupling body comprises a threaded end coupled to a threaded end of the housing body.

23. A method of attaching a pin to a body of a connector housing, the method comprising:
   providing a connector housing having a body including a first surface, a second surface and an aperture extending through the body from the first surface to the second surface;
   disposing the pin in the aperture, the pin having a cavity, an external surface and a projection along the external surface;
   positioning a first end of the pin through the aperture and beyond the first surface of the body;
   inserting an object within the cavity, the object having an outer dimension greater than an inner dimension of the cavity, thereby expanding the external surface of the pin and securing the pin to the body; and
   mating the first end of the pin with a locking groove on an external surface of a coupling body, wherein the coupling body comprises a threaded end coupled to a threaded end of the housing body.

24. A connector body for use in a fiber optic connector, comprising:
   a housing having a body, an inner surface, an outer surface and an aperture through the body from the outer surface to the inner surface;
   a retaining body having a cavity and an external surface, a portion of the retaining body extending through the aperture and beyond the inner surface of the housing body, and a portion of the cavity having a chamfered surface and is capable of radially expanding;
   a projection along the external surface, the projection disposed substantially flush with a surface of the aperture;
   an object having an outer dimension greater than an inner dimension of the cavity, the object rigidly disposed within the cavity; and
   a locking groove on an external surface of a coupling body, the locking groove configured to mate with the portion of the retaining body, wherein the coupling body comprises a threaded end coupled to a threaded end of the housing body.

* * * * *

UNITED STATES PATENT AND TRADEMARK OFFICE
CERTIFICATE OF CORRECTION

| | | |
|---|---|---|
| PATENT NO. | : 7,575,379 B2 | Page 1 of 1 |
| APPLICATION NO. | : 11/473373 | |
| DATED | : August 18, 2009 | |
| INVENTOR(S) | : Vincent A. Wouters | |

It is certified that error appears in the above-identified patent and that said Letters Patent is hereby corrected as shown below:

Column 8, Claim 9, line 13, delete "form" and insert -- from --.

Signed and Sealed this

Third Day of November, 2009

David J. Kappos
*Director of the United States Patent and Trademark Office*